(12) United States Patent
Bloomer

(10) Patent No.: US 6,895,896 B1
(45) Date of Patent: May 24, 2005

(54) COMPOSITE CAT LITTER GRANULE CONTAINING ENTRAPPED SMALL SIZE SILICA GEL PARTICLES

(76) Inventor: Larry D. Bloomer, 3425 E. 96th Pl., Tulsa, OK (US) 74137

( * ) Notice: Subject to any disclaimer, the term of this patent is extended or adjusted under 35 U.S.C. 154(b) by 6 days.

(21) Appl. No.: 10/611,350

(22) Filed: Jul. 1, 2003

Related U.S. Application Data

(63) Continuation-in-part of application No. 09/878,725, filed on Jun. 11, 2001, now Pat. No. 6,659,042.

(60) Provisional application No. 60/210,813, filed on Jun. 9, 2000.

(51) Int. Cl.$^7$ ............................................. A01K 1/01
(52) U.S. Cl. ................................................. 119/173
(58) Field of Search .................. 119/173, 171, 172

(56) References Cited

U.S. PATENT DOCUMENTS

| | | | | |
|---|---|---|---|---|
| 4,085,704 A | * | 4/1978 | Frazier ........................ | 119/173 |
| 4,157,696 A | | 6/1979 | Carlberg ...................... | 119/171 |
| 4,305,345 A | | 12/1981 | Otoguro ...................... | 119/172 |
| 4,374,794 A | | 2/1983 | Kok ............................ | 119/172 |
| 4,560,527 A | | 12/1985 | Harke et al. ................. | 264/500 |
| 4,591,581 A | | 5/1986 | Crampton et al. ........... | 502/407 |
| 4,619,862 A | | 10/1986 | Sokolowski et al. ......... | 428/221 |
| 4,621,011 A | | 11/1986 | Fleischer et al. ............ | 428/221 |
| 4,721,059 A | | 1/1988 | Lowe et al. .................. | 119/172 |
| 4,931,139 A | | 6/1990 | Phillips ....................... | 119/172 |
| 5,000,115 A | | 3/1991 | Hughes ....................... | 119/173 |
| 5,019,564 A | | 5/1991 | Lowe et al. .................. | 514/75 |
| RE33,983 E | | 7/1992 | Hughes ....................... | 119/173 |
| 5,129,365 A | | 7/1992 | Hughes ....................... | 119/173 |
| 5,143,023 A | | 9/1992 | Kuhns ......................... | 119/173 |
| 5,215,041 A | | 6/1993 | Krahenbuhl ................. | 119/171 |
| 5,317,990 A | | 6/1994 | Hughes ....................... | 119/173 |
| 5,342,525 A | | 8/1994 | Rowsell ...................... | 210/611 |
| 5,372,314 A | | 12/1994 | Manning ..................... | 241/21 |
| 5,386,803 A | | 2/1995 | Hughes ....................... | 119/173 |
| 5,450,817 A | | 9/1995 | Hähn et al. .................. | 119/173 |
| 5,452,684 A | | 9/1995 | Elazier-Davis et al. ..... | 119/173 |
| 5,456,737 A | | 10/1995 | Manning ..................... | 71/16 |
| 5,503,111 A | | 4/1996 | Hughes ....................... | 119/173 |
| 5,505,774 A | | 4/1996 | Manning ..................... | 106/697 |
| 5,510,310 A | | 4/1996 | Manning ..................... | 502/412 |
| 5,577,463 A | | 11/1996 | Elazier-Davis et al. ..... | 119/173 |
| 5,664,523 A | | 9/1997 | Ochi et al. .................. | 119/173 |
| 5,719,098 A | | 2/1998 | Hähn et al. .................. | 502/407 |

(Continued)

FOREIGN PATENT DOCUMENTS

GB    2 189 125 A    10/1987

(Continued)

*Primary Examiner*—Yvonne R. Abbott
(74) *Attorney, Agent, or Firm*—Fellers, Snider, Blankenship, Bailey & Tippens, P.C.

(57) ABSTRACT

The present invention is directed to enhancing the odor control of a manufactured composite cat litter granule by including as a component thereof and entrapped therein an effective odor controlling amount of small size silica gel particles. The manufactured granule preferably includes a clay component but may rather include any number of absorbent filler materials such as paper mill sludge, recycled paper, corn cob renderings, rice or peanut hulls, or other organic plant materials, so long as the materials can be agglomerated into a cat litter granules and entrap small size silica gel particles.

20 Claims, 10 Drawing Sheets

U.S. PATENT DOCUMENTS

| | | | |
|---|---|---|---|
| 5,724,915 A | 3/1998 | Ochi et al. | 119/173 |
| 5,897,700 A | 4/1999 | Manning | 106/697 |
| 5,970,915 A * | 10/1999 | Schlueter et al. | 119/171 |
| 6,019,063 A | 2/2000 | Haubensak et al. | 119/173 |
| 6,020,282 A | 2/2000 | Taylor et al. | 502/84 |
| 6,089,189 A | 7/2000 | Goss et al. | 119/172 |
| 6,206,947 B1 | 3/2001 | Evans et al. | 71/63 |
| 6,276,300 B1 | 8/2001 | Lewis et al. | 119/172 |
| 6,578,521 B2 | 6/2003 | Raymond et al. | 119/171 |
| 2001/0052326 A1 | 12/2001 | Elli | 119/171 |

FOREIGN PATENT DOCUMENTS

| | | |
|---|---|---|
| WO | WO 86/00496 | 1/1986 |

* cited by examiner

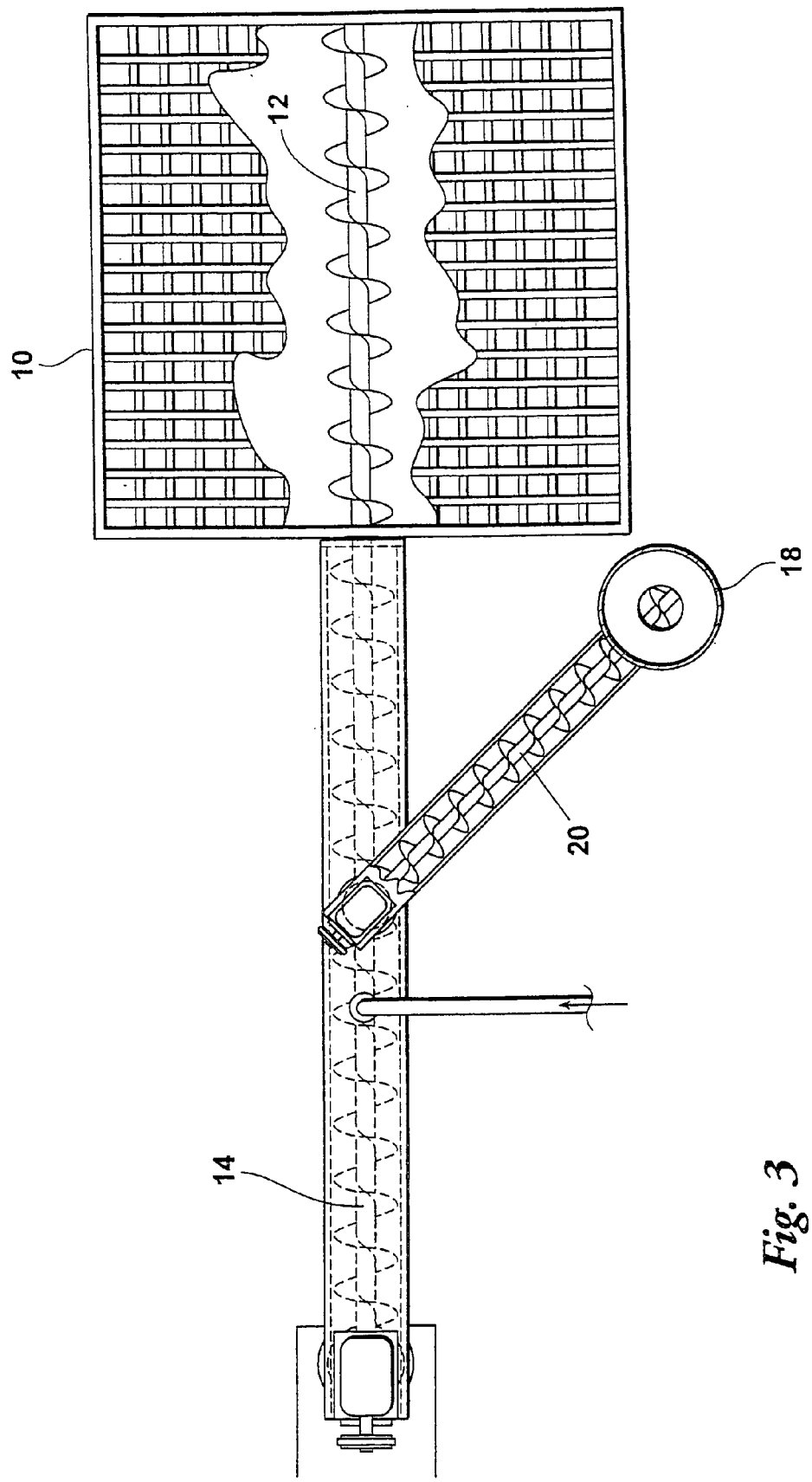

COMPOSITE CAT LITTER GRANULE CONTAINING ENTRAPPED SMALL SIZE SILICA GEL PARTICLES

CROSS REFERENCE TO RELATED APPLICATION

This application is a continuation-in-part of U.S. patent application Ser. No. 09/878,725, filed 11 Jun. 2001 Now U.S. Pat. No. 6,659,042, which application claims the benefit of U.S. Provisional Patent Application Ser. No. 60/210,813, filed 9 Jun. 2000, both of which are hereby incorporated by reference.

BACKGROUND OF THE INVENTION

1. Field of the Invention

This invention relates generally to cat litter products, and, more particularly, to a manufactured composite cat litter granule containing entrapped small size silica gel particles.

2. Background of the Invention

Moisture absorbent particles have many uses, both industrial and domestic. One particularly large domestic use is in the pet products industry as cat litter. Cat litter is a broad term for waste and odor absorbent products useful for many different types of animals, however, cats being the most plentiful due to their popularity as pets and their ease in house-breaking. It is desirous to provide a cat litter material that is capable of absorbing urine and odors associated with animal waste.

Materials traditionally used as cat litter due to their moisture absorbent characteristics include bentonite (montmorillonite) clays. Such bentonite clays include sodium bentonite, calcium bentonite, potassium bentonite, lithium bentonite, magnesium bentonite, or some combination of those clays. However, the moisture characteristics of those clays are not equal. Sodium bentonite is known to have better moisture absorbing properties than the other clays.

It is also known that sodium bentonite particles, upon absorbing moisture, swell and bind together as a mass (agglomerate). This is particularly desirable because the mass, including the liquid waste contained therein, can be easily and integrally removed and discarded. Thus, the source of odor in a litter box can be conveniently removed without the necessity of changing out the entire box. The result of this, however, is to place a premium on sodium bentonite for cat litter purposes. A need, therefore, exists for a process that combines clumping cat litter, such as sodium bentonite with other materials of lesser value, to form a composite product that maintains the clumping properties of the bentonite clay.

It is well known that waste cellulosic fiber and paper mill sludge, which are produced in large quantities in most industrial nations of the world today, due to the large usage of paper, constitute a substantial environmental problem. Paper mill sludge has substantially little usage as a material that can be employed in other industrial applications. Because of this non-utility, the paper mill sludge is merely discarded, along with other waste cellulosic fiber. This creates a tremendous disposal problem. A need, therefore, exists to reform waste cellulosic fiber and paper mill sludge into a usable product.

A particular known problem with all clay cat litter products and particularly clumping cat litter products is their weight/volume ratio. A significant amount of cat litter product is necessary to fill a litter box. It is known that such cat litter boxes are changed every 5–10 days, depending on the number of animals, to avoid odor problems. As a result, it is necessary to purchase a sufficient volume of cat litter in order to avoid frequent trips to the pet store or pet aisle of a grocery store. Moreover, as with most products, there are certain economics to be gained through the purchase of larger volumes. The problem is that the container for a sufficient volume and economy of clumping cat litter product is generally heavy, approximately 60 lbs./cubic foot or more for an all clay product. Such weights are awkward, and in some cases, impossible for some people to handle. A need, therefore, exists for an effective cat litter product with a reduced weight/volume ratio.

Applicant's copending U.S. patent application Ser. No. 09/878,725 addresses the aforementioned needs by combining bentonite clay and waste cellulosic material in a process rendering an agglomerated composite cat litter particle. In the application it is disclosed that odor control agents, such as activated carbon, chabazite (zeolite) or other suitable materials, including silica gel dust, could be added to the process during the component introduction step. It is taught that when the particles are agglomerated and then dried, the odor control agent is trapped inside the particle. As a result, the odor control agent forms an integral part of the manufactured particle itself as opposed to being a separate and discrete element of the cat litter product.

U.S. Pat. No. 5,970,915 discloses the use of silica gel as a litter box filler material, while U.S. Pat. No. 6,543,385 discloses an animal litter composition comprising a mixture of an absorbent material such as clay and silica gel. Said patents are hereby incorporated by reference. Both described litter products, however, are directed to the use of silica gel particles of a relatively large size as a separate and discrete component of a litter box filler material. The '915 patent describes the use of loosely packed macroporous silica gel in granular form as a cat litter, with the particle size ranging from between about 1 millimeter to about 10 millimeters. The '385 patent likewise describes the use of discrete silica gel particles, but as an adjunct to a typical clay-based litter product. The preferred litter product contains silica gel particles ranging from between about 1 millimeter to about 5 millimeters.

Recognizing that silica gel is substantially more costly than clay-based litter box fillers, the '385 patent describes decreasing cost by combining particles of silica gel with clay particles, while maintaining odor control benefits. Yet, the resulting product is still relatively expensive. Additionally, since the particles of clay and silica gel are discrete particles, they are prone to separate. Thus, to obtain the desired benefit enough silica gel particles must be used to ensure dispersion throughout the volume of cat litter product. And, in any event, a uniform dispersion once the litter product is poured into the litter box is not guaranteed.

It is accordingly an object of the present invention to obtain the benefit of odor control offered by utilization of silica gel while solving the problems associated with particle delivery, uniformity of product, and cost.

SUMMARY OF THE INVENTION

The present invention is directed to enhancing the odor control of a manufactured composite cat litter granule by including as a component thereof and entrapped therein an effective odor controlling amount of small size silica gel particles. The manufactured granule preferably includes a clay component but may rather include any number of absorbent filler materials such as paper mill sludge, recycled paper, corn cob grindings, rice or peanut hulls, or other organic plant materials, so long as the materials can be agglomerated into a cat litter granules and entrap small size silica gel particles.

The cat litter product preferably includes composite agglomerated granules formed of at least (i) particles of an absorbent filler material and (ii) an effective odor controlling amount of silica gel particles. Preferably, the granules are substantially in the size range of from 30 mesh to 6 mesh and substantially all of the silica gel particles are minus 20 mesh in size. In one embodiment, 50% or more of the silica gel particles are minus 200 mesh in size. The filler material preferably comprises clay, such as bentonite clay, e.g., calcium or sodium bentonite. Preferably, substantially all of the particles of the clay and the silica gel particles are minus 20 mesh in size. In another embodiment, the majority of the particles of the clay and the silica gel particles are minus 200 mesh in size. The silica gel is preferably a Type C silica gel. Preferably, the cat litter product has from 1–70 wt. % silica gel particles, more preferably has from 1–10 wt. % silica gel particles, and most preferably has from 3–5 wt. % silica gel particles.

The inventive granule may be manufactured utilizing the economical processes described in Applicant's parent application and in Canadian laid open patent application no. 2,349,953. The processes include: (1) component introduction; (2) combining the particles of an absorbent filler material and an effective odor controlling amount of silica gel particles, with or without other components and additives; (3) transferring the mixture to a secondary rotating drum mixer for particle shaping; (4) drying the mixed and shaped particles; and (5) particle size separation (screening). The finished product is a highly absorbent composite agglomerated granule having good odor control characteristics.

A better understanding of the invention and its objects and advantages as well as further objects will become apparent to those skilled in this art from the following detailed description, taken in conjunction with the attached drawings, whether is shown and described only the preferred embodiment of the invention, simply by way of illustration of the best mode contemplated for carrying out the invention. As will be realized, the invention is capable of modifications and various obvious respects, all without departing from the scope of the invention. Accordingly, the description should be regarded as illustrative in nature and not as restrictive.

BRIEF DESCRIPTION OF THE DRAWINGS

FIG. 3 is a view taken along line 3—3 of FIG. 2A.

DETAILED DESCRIPTION OF THE PREFERRED EMBODIMENT

Figure 1:
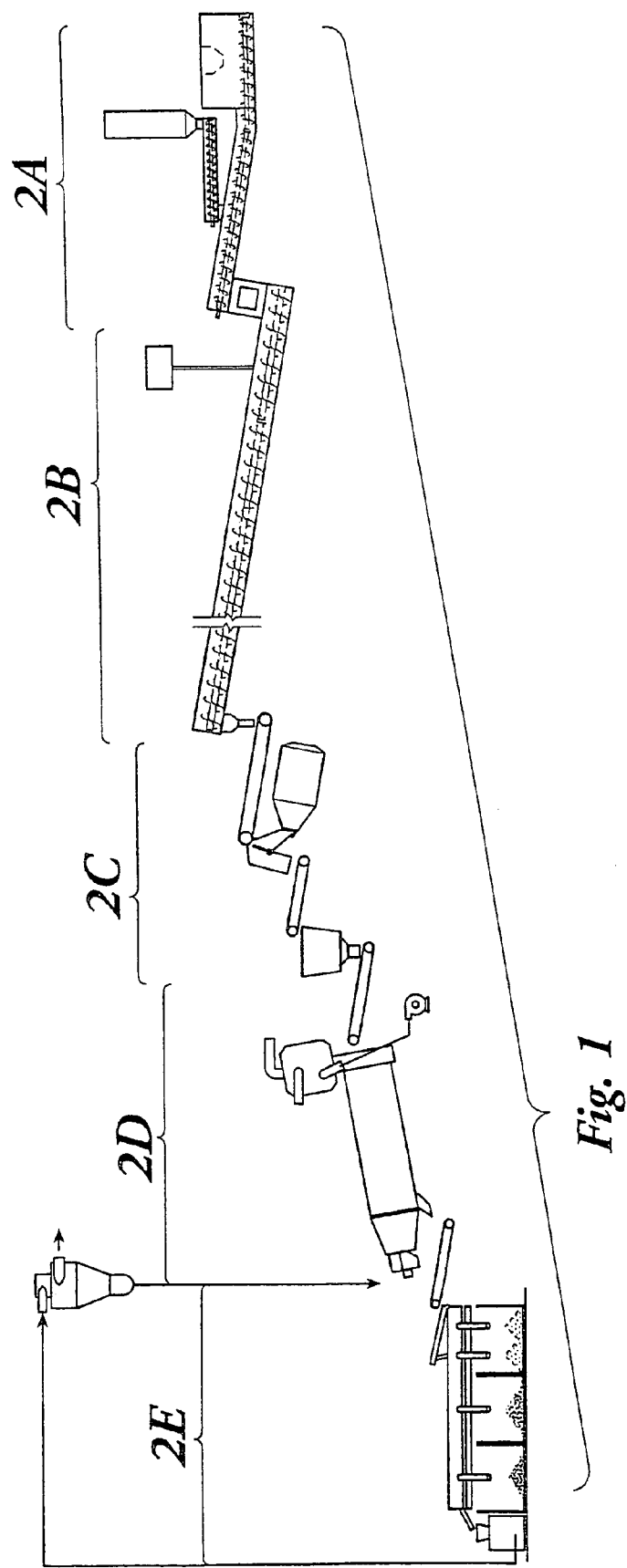
FIG. 1 is an overall process sketch of the method of manufacture of an absorbent particle of the present invention identified with its component substeps.

The preferred embodiment of the present invention includes combining absorbent filler material such as bentonite, or similar clay, which may or may not form a clump when in contact with cat urine depending on the type of clay used, with an effective odor controlling amount of silica gel particles to form an odor controlling cat litter. With reference to FIG. 1, the process can be broken down for the purpose of illustration into five main substeps: (1) Reactant stream introduction (2A); (2) component mixing (2B); (3) particle shaping (2C); (4) drying (2D); and, (5) separation (2E). This general description is for the purpose of illustration herein and shall not be considered limiting. In one example, a bentonite clay, preferably sodium bentonite, is combined with paper mill sludge including waste cellulosic fibrous material in the manufacture of a cat litter product which retains the moisture swellable and clumping properties of the bentonite clay but has a lower weight/volume ratio than does an all clay product.

Throughout the specification, the preferred equipment is referenced. It should be understood, however, that this equipment is provided to illustrate the best mode known at the time for carrying out the invention. The use of equivalent equipment or equipment of different dimensions should be understood to fall within the scope of this invention.

The inventive granule is preferably made utilizing either the process described in the incorporated parent application, set out in more detail below, or the process described in the incorporated Canadian application no. 2,349,953, so long as the desired particles of silica gel are utilized in the composite agglomerated granules formed thereby.

Figure 2A:
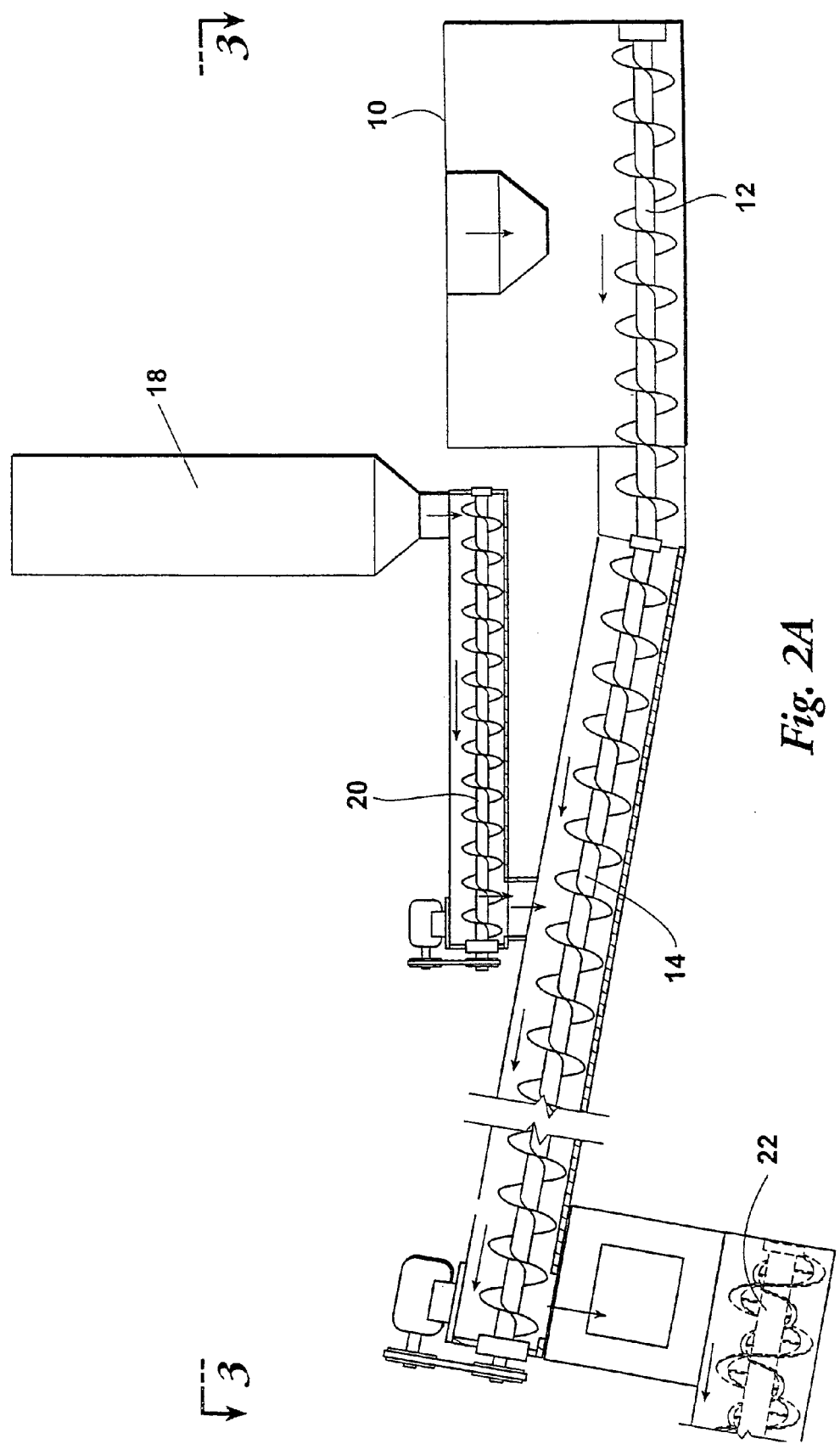
FIG. 2A depicts the component introduction substep 2A of FIG. 1.

Reference will now be made to FIGS. 2A and 3 as an example process of manufacturing a composite clumping cat litter in connection with the present invention, and including the optional use of paper mill sludge as a lighter weight filler material, although it should be recognized that in connection with the present invention it is not required that the litter be a clumping litter or that waste cellulosic materials be utilized.

Sodium bentonite clay of a particle size capable of passing through a 20 mesh sieve is deposited and stored in a dump hopper 10. At the bottom of dump hopper 10, there is an auger 12 for conveying the sodium bentonite clay to the upstream end of a mix-auger 14. By varying the size or speed of rotation of auger 12, the amount of clay processed into mix-auger 14 can be controlled. A pre-determined amount of sodium bentonite is delivered by auger 12 into the mix-auger 14.

Mix-auger 14 functions to mix the sodium bentonite clay with cellulosic fibrous material, preferably derived from paper mill waste, should such be desired. The waste cellulosic fibrous material is introduced into mix-auger 14 through sludge storage reservoir 18 to mix with the sodium bentonite clay to form a reactant stream. The cellulosic fibrous material is discharged into the bentonite clay by a metering conveyor 20 thus allowing control of material ratios.

In the alternate embodiment, the cellulosic paper mill sludge is dried through the drier and then processed through a hammer mill in order to reduce the size of the particles. Once dried and sized, the small dry particles of paper (cellulosic material) are dry blended (mixed) with the bentonite clay in mix auger 14. Once dry mixed, water is added to the paper/bentonite clay dry mix to form an agglomerated particle which are further processed in the same manner as described below.

The composition of paper mill sludge varies slightly depending upon the particular manufacturer from which it is obtained. Paper mill sludge generally comprises cellulosic fibrous materials, water, and fillers, in addition to contaminants. Normal paper mill sludge has a solids content of 40–90 weight percent fiber (the fibers are typically 500–1000 microns in length) and 10–60 weight percent filler. Fillers include such materials as kaolin clay, barytes, titanium dioxide and other plant fibers. Clay is the most important of the filler components. Some paper mill sludges might have a negligible or very low (3%) clay content by weight, while others might have up to a 40% clay content by weight. Raw paper mill sludge has a usual water content ranging from 60–90 weight percent. In the preferred combination, the cellulosic fibrous material has an $H_2O$ content of between 55% and 75% by weight while the $H_2O$ content of the bentonite clay is 15% or less. The water content in the paper mill sludge facilitates agglomeration of the composite particles. When this agglomeration is dried, the particle decreases in size thus binding the two materials tightly to create a low dust, absorbent particle that has a lower weight/volume ratio than an all clay particle, that swells and forms a scoopable clump. Thus, the swelling/clumping properties of the bentonite clay are retained. The lighter weight/volume ratio is desirable for a variety of reasons: (1) less weight for the consumer to carry in the same volume; (2) less cost to ship from manufacture to retailer; and (3) a higher cost per pound for the manufacturer yet still providing the retailer the ability to sell the same volume for the same price as heavier scoopable cat litter products.

As used herein the term "paper mill sludge" encompasses bi-products of the production of paper as described above, mixtures of said bi-products and waste cellulosic fibrous materials, slurried waste cellulosic fibrous materials and slurried plant fibrous materials.

The silica gel particles may be added during the reactant introduction step through an additional silo and metering conveyor (similar to silo 18 and metering conveyor 20 of FIG. 2A) into the reactant stream. In the preferred embodiment, the silica gel particles are 20 mesh (0.84 m) in size. Most preferably, 50% or more of the silica gel particles are minus 200 mesh (0.84 mm) in size. The silica gel is preferably type C gel. The final cat litter product may include 1–70 wt. % silica gel particles, but more preferably, the cat litter product is 1–10 wt. % silica gel particles, and, most preferably, is 3–5 wt. % silica gel particles.

Other odor control agents may be added if desired, including chabazite, having a particle size of 0 to 5 Å to provide an end product that is 1–15% by weight chabazite. Chabazite is a naturally hydrated calcium ammonium silicate zeolite ($CaAl_2Si_4O_{12}$ $6H_2O$) available commercially. Chabazite is frequently used in water treatment and particularly water softening by providing cationic exchange of the sodium of the zeolite of the calcium or magnesium contained hard water. In the present process, however, the chabazite may be introduced to provide its known odor elimination properties of the final product. Another additive contemplated in the present process is activated carbon added in powder form of approximately 5–15 Å particle sizes also for the purpose of odor control/elimination. The powder activated carbon and the chabazite are, as is the case with the silica gel particles, sealed within the composite particle as the particles are agglomerated according to the present process and function to absorb (trap) gas molecules in the final product.

Yet another additive contemplated is a desiccant pellet dust to provide increased moisture absorbency to the composite. The addition of the desiccant is also intended to absorb ammonia from cat urine thereby trapping/neutralizing odor. Known desiccants include activated alumina, calcium chloride or zinc chloride.

Clumping of the product produced by the process of the present invention is desirous so as to facilitate removal of the animal waste from the litter box. If the product clumps when subjected to the moisture in the animal waste, the clump, including the waste and the odor associated therewith, can be easily removed. The clumping properties of the product can be improved by the addition of agents such as natural resins and plant gums.

Once the reaction components are introduced into mix-auger 14, the reactant stream is conveyed by mix-auger 14 and deposited into reaction mixer unit 16. It is within reaction mixer unit 16 that intimate mixing takes place between the components in the manufacture of a composite particle.

Figure 2B:
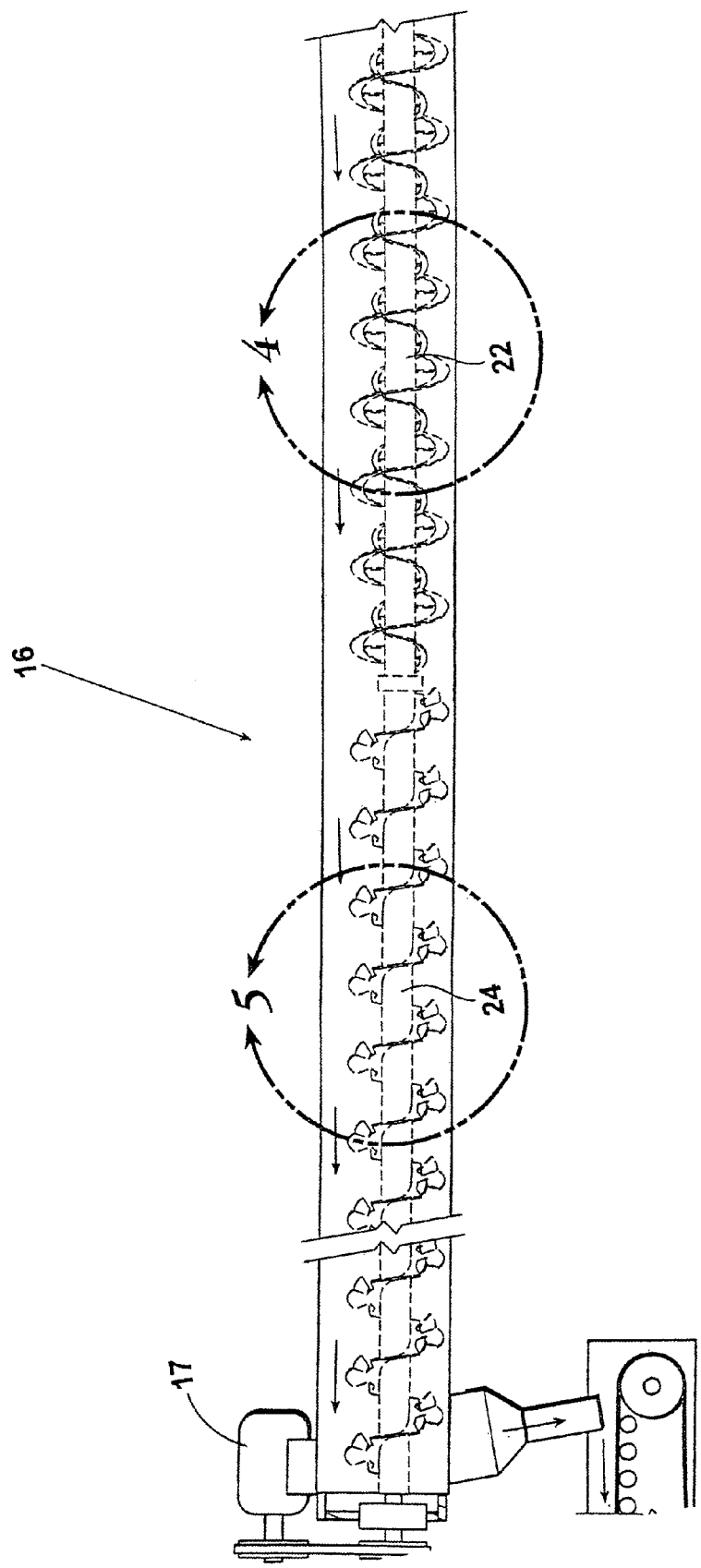
FIG. 2B depicts the component mixing substep 2B of FIG. 1.
Figure 2C:
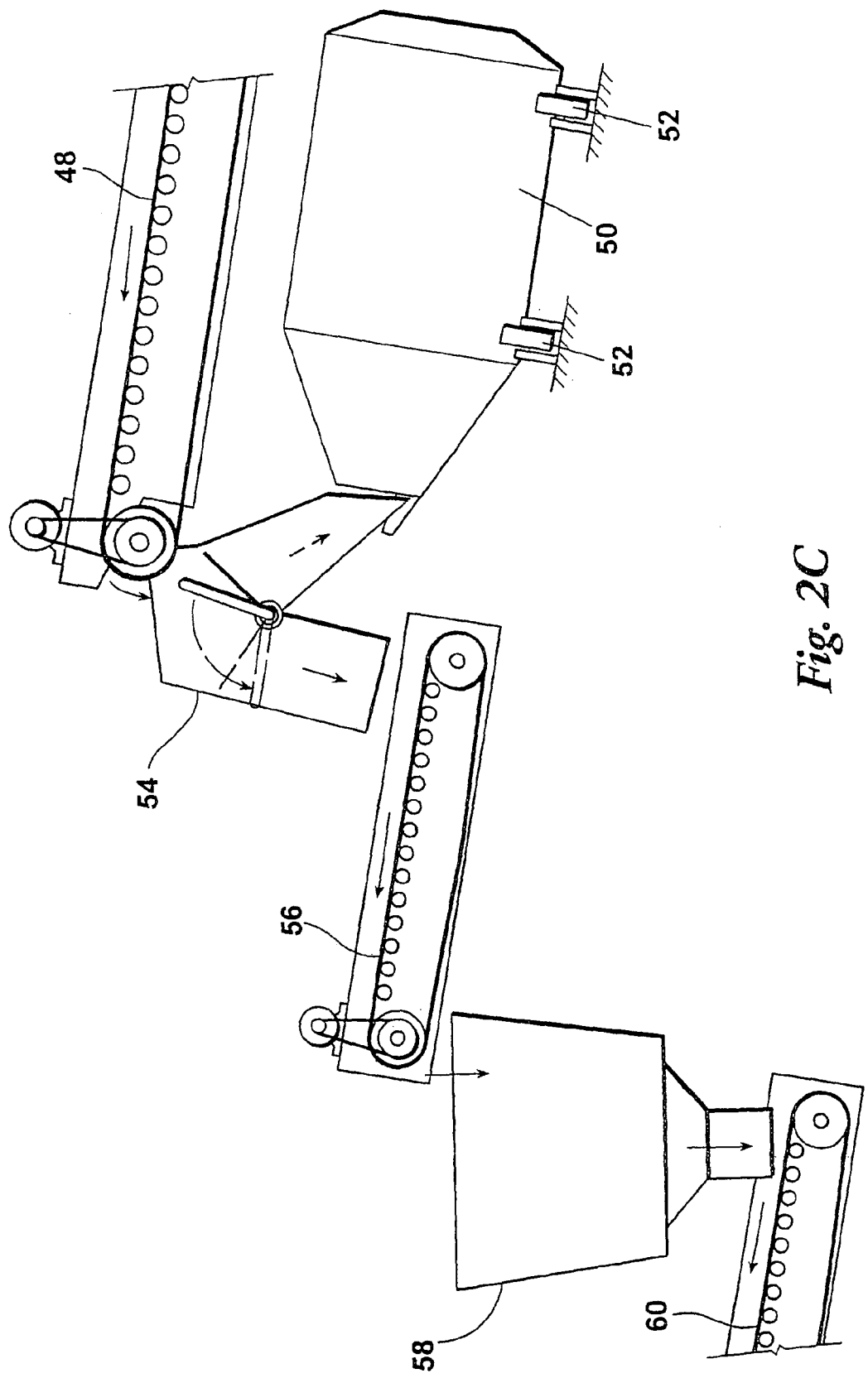
FIG. 2C shows the particle shaping substep 2C of FIG. 1.

Reference is next made to FIG. 2B for a discussion of reaction mixer unit 16. Reaction mixer unit 16 is a 60' long reaction chamber in the preferred embodiment. The length of reaction mixer unit 16 is divided into two major phases. The first phase includes subjecting the reactant stream to a thorough mixing/agitation process, and the second phase includes intimate mixing/agitation/shear of the component particles comprising the reactant stream.

The length of the reaction mixer unit 16 is set at a 10° incline and powered by motor 17. The total 60' length is divided into auger flighting, each flight being 12' in length. The mixing/agitation phase within reaction mixer unit 16 is accomplished by a 12' double ribbon auger flighting 22. The intimate mixing/agitation/shear phase is carried out by cut and fold auger flighting 24. In the preferred embodiment there are four (4) cut and fold auger flighting segments, each 12' in length. Reaction mixer unit 16 comprised of its two phases operates at a speed of 60 rpm in order to convey a desired discharge of 19 cubic tons per hour, weighing between 20 pounds per cubic foot and 50 pounds per cubic foot.

Figure 4:
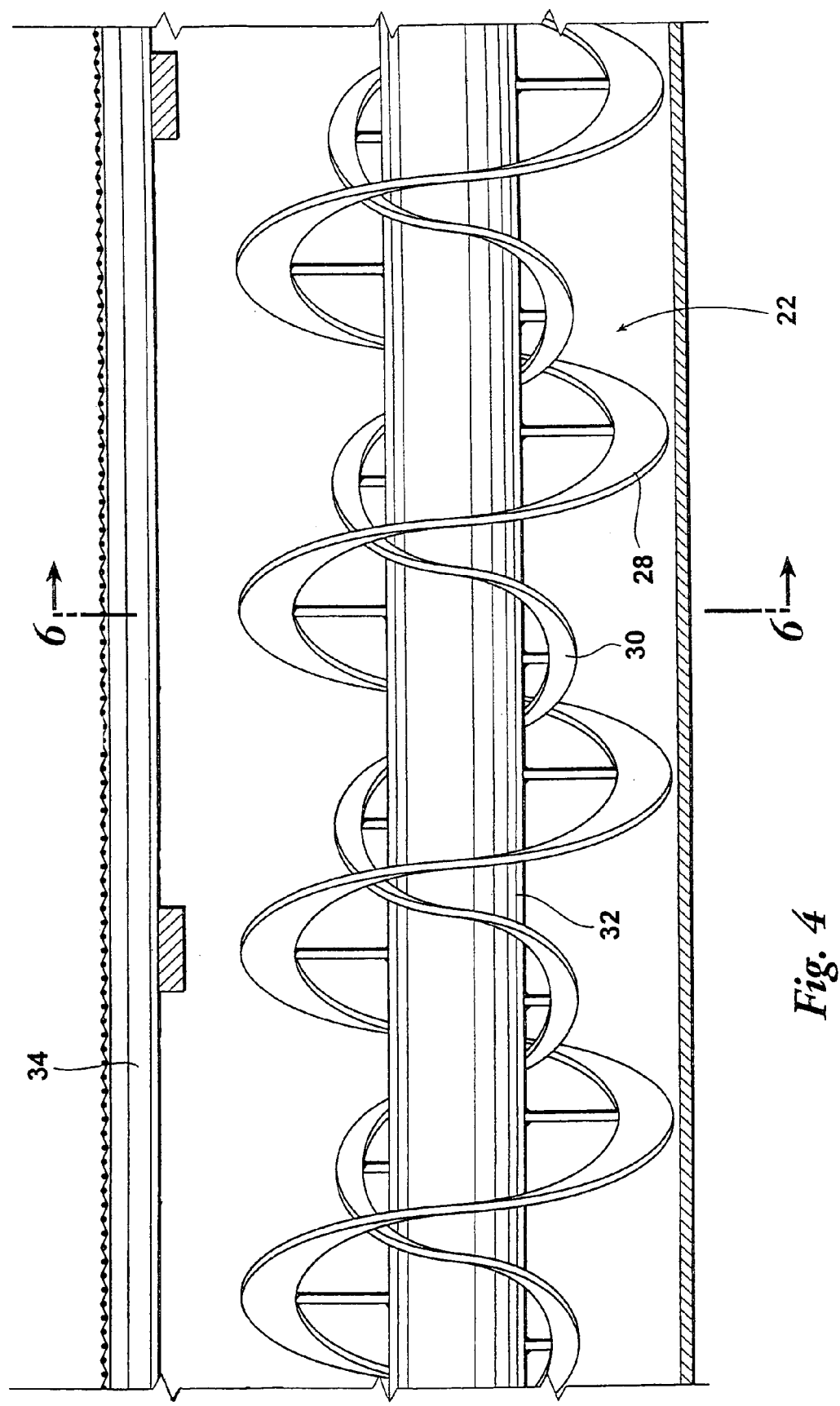
FIG. 4 is a detail view of the double ribbon flighting of FIG. 2B.

FIG. 4 is a detailed view of double ribbon auger flighting 22 of FIG. 2B. As can be seen, double ribbon auger flighting 22 includes an outer ribbon 28 and an inner ribbon 30. The double ribbon auger flighting 22 acts to convey the reactant stream while providing thorough mixing and agitation of the component particles conveyed there through.

Outer ribbon 28 includes a 2" wide blade with a 12" inner diameter, while inner ribbon 30 includes a 1" blade and 9" outer diameter in the preferred embodiment. Such double ribbon auger configurations are available commercially. Outer ribbon 26 and inner ribbon 28 are mounted on and supported from a 5" diameter central pipe 32.

Figure 6:
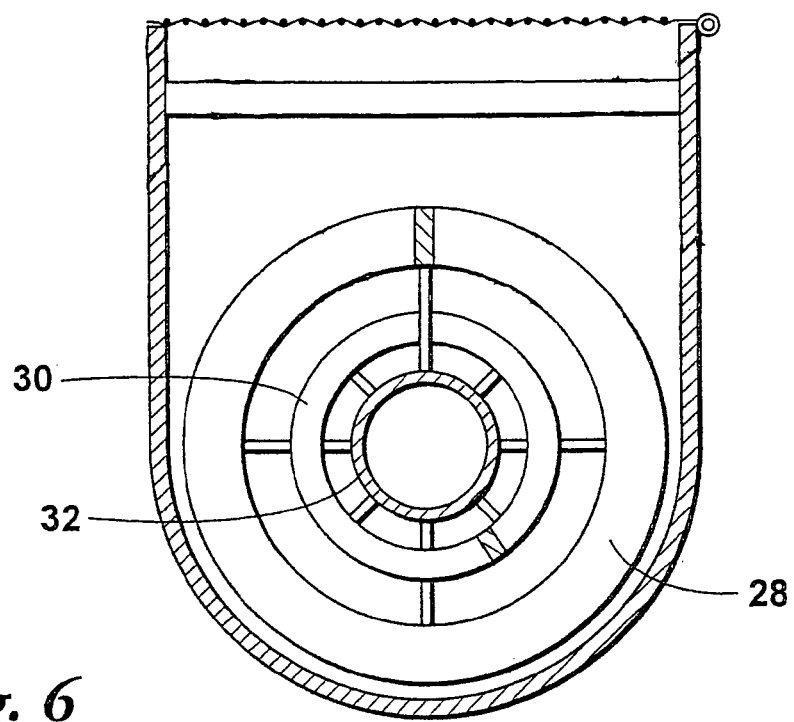
FIG. 6 is a cross sectional view taken along line 6—6 of FIG. 4 showing the cross section of the double ribbon auger flighting.

FIG. 6 depicts double ribbon auger flighting 22 from a cross-section showing outer ribbon 28 and inner ribbon 30 supported from central pipe 32. The support structure for outer ribbon 28 and inner ribbon 30 are depicted in FIG. 6.

Referring back to FIG. 2B, cut and fold auger flighting 24 provides intimate mixing, shearing, and agitation of the component particles of the reactant stream. The water contained within the cellulose creates an environment to blend the two components along with the sticking/swelling action that is characteristic of sodium bentonite in a process to form an agglomerated particle.

Figure 5:
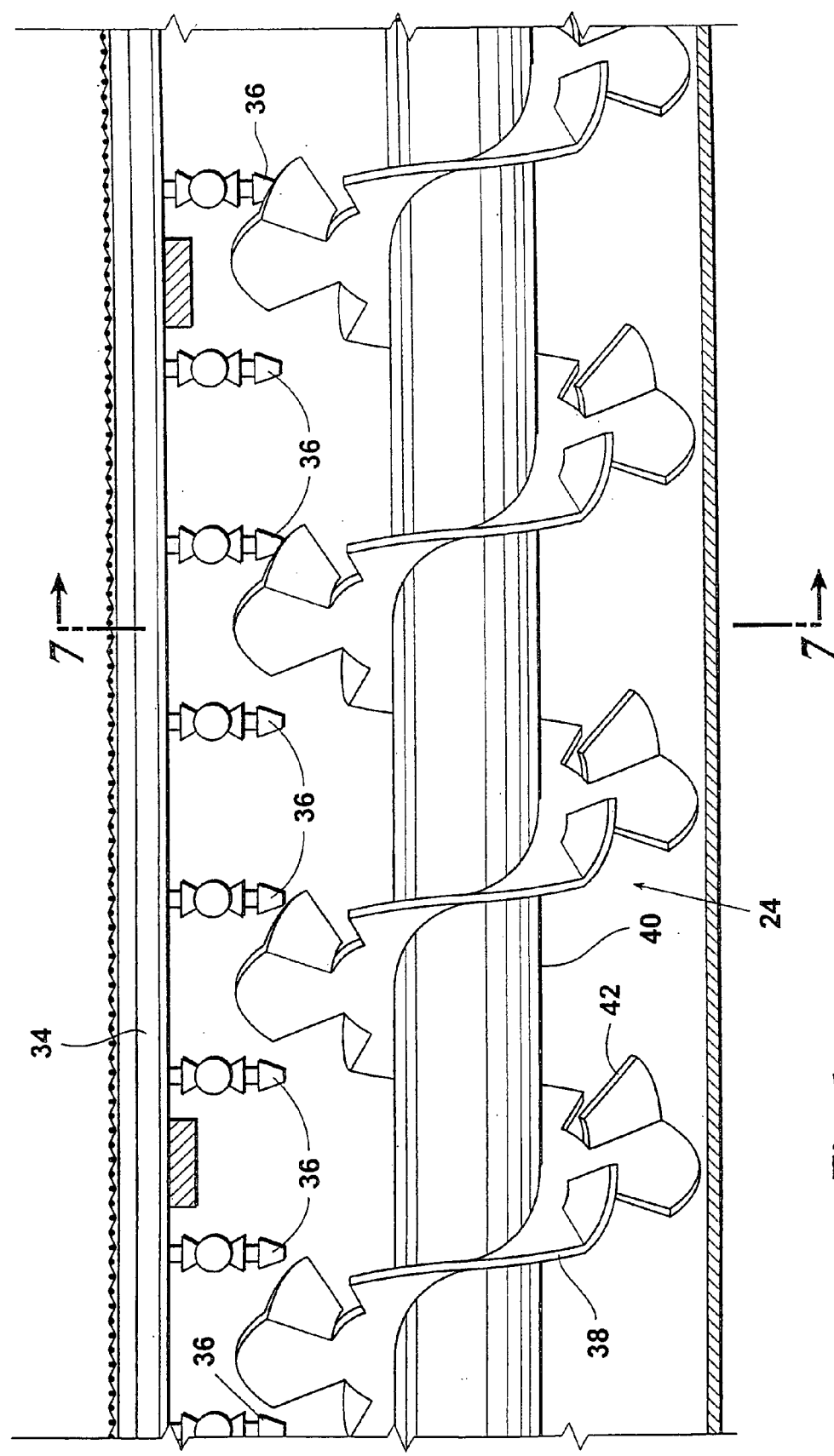
FIG. 5 is a detail view of the cut and fold auger flighting of FIG. 2B.

FIG. 5 is a detail of cut and fold auger flighting 24 of FIG. 2B. Cut and fold auger flighting is known commercially to provide intimate mixing, agitation, and particle shear. Cut and fold auger flighting 24 includes a blade 38 on a 5" center shaft 40. Screw blade 38 is 16" in diameter and is notched along its outer circumference. The reactant stream covers a 45% area of screw blade 38 such that 70% of the reactant stream is conveyed and 30% is dropped so as to be worked back into the reactant stream thereby providing the intimate mixing/agitation/shear described herein. The mixing/agitation/shear in the presence of the water contained in the cellulose acts to bind the two component materials as described above. Sodium bentonite is known to swell when absorbing moisture. The water in the cellulose serves the purposes of a transport means to infuse the fibrous material into the porous sodium bentonite particle to provide mechanical cohesion and serves an agglomeration and lubricity function by cementing the particles together. In the event that the volume of water in the cellulose is insufficient to facilitate particle agglomeration, water may be added via water conduit 34 and spray nozzles 36 to provide for sufficient agglomeration.

Figure 7:
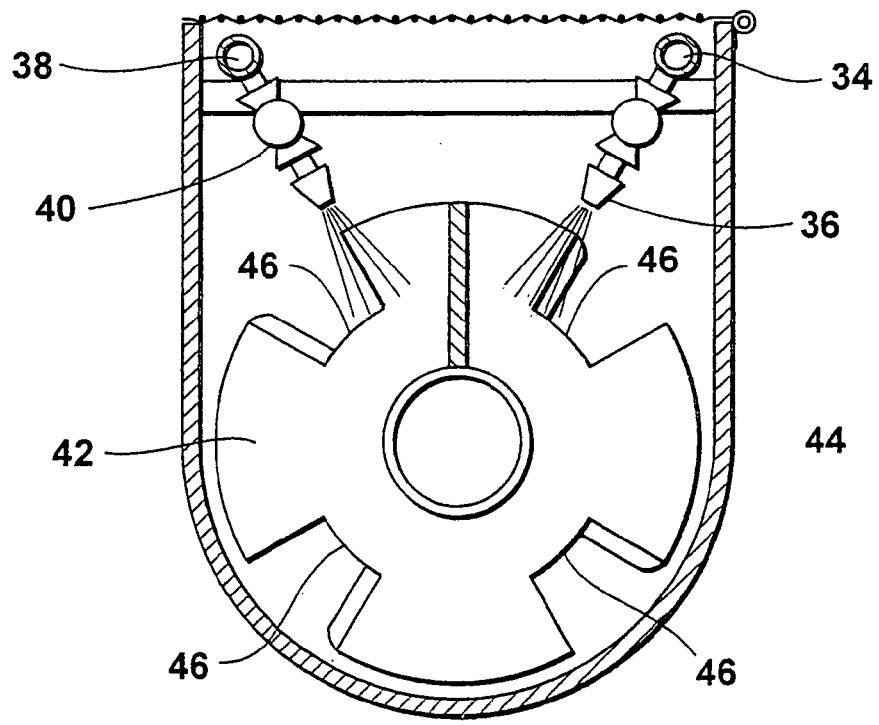
FIG. 7 is a cross section view taken along line 7—7 of FIG. 5 depicting the cut and fold auger flighting.

FIG. 7 depicts cut and fold auger flighting 24 in cross-section. Notches 46 and blade 42 allow material in the reactant stream to be dropped and folded back into the reactant stream. The aggressive shape of the cut and fold blades provide for the particle shear.

Once the composite particles are manufactured, the reactant stream is conveyed for further processing. A belt conveyor 48 transports the reactant stream to a shaper/mixer 50. The shaper/mixer 50 shapes the composite particles into generally spheroidal granules. Shaper/mixer 50 is comprised of a truck-mixer, such as a standard cement mixer, mounted on a skid and capable of rotation by rollers 52. Once the reactant stream reaches the shaper/mixer 50, the process becomes a batch process in that a batch of composite particles is supplied to shaper/mixer and then rolled therein. Once the step of shaping/mixing is completed, the batch reactant stream is transferred from shaper/mixer 50 through a transfer point 54 and supplied to a conveyor 56 such that the shaped composite particle may be conveyed to surge hopper 58. Surge hopper 58 acts to shake the agglomerated particles thereby separating adjacent particles to form a granulated mixture of individual composite particles. Surge hopper 58 also acts to control the volume of granulated mixture process through the dryer as shall be next described. As a result, the moisture content of the manufactured composite product is controlled.

Figure 2D:
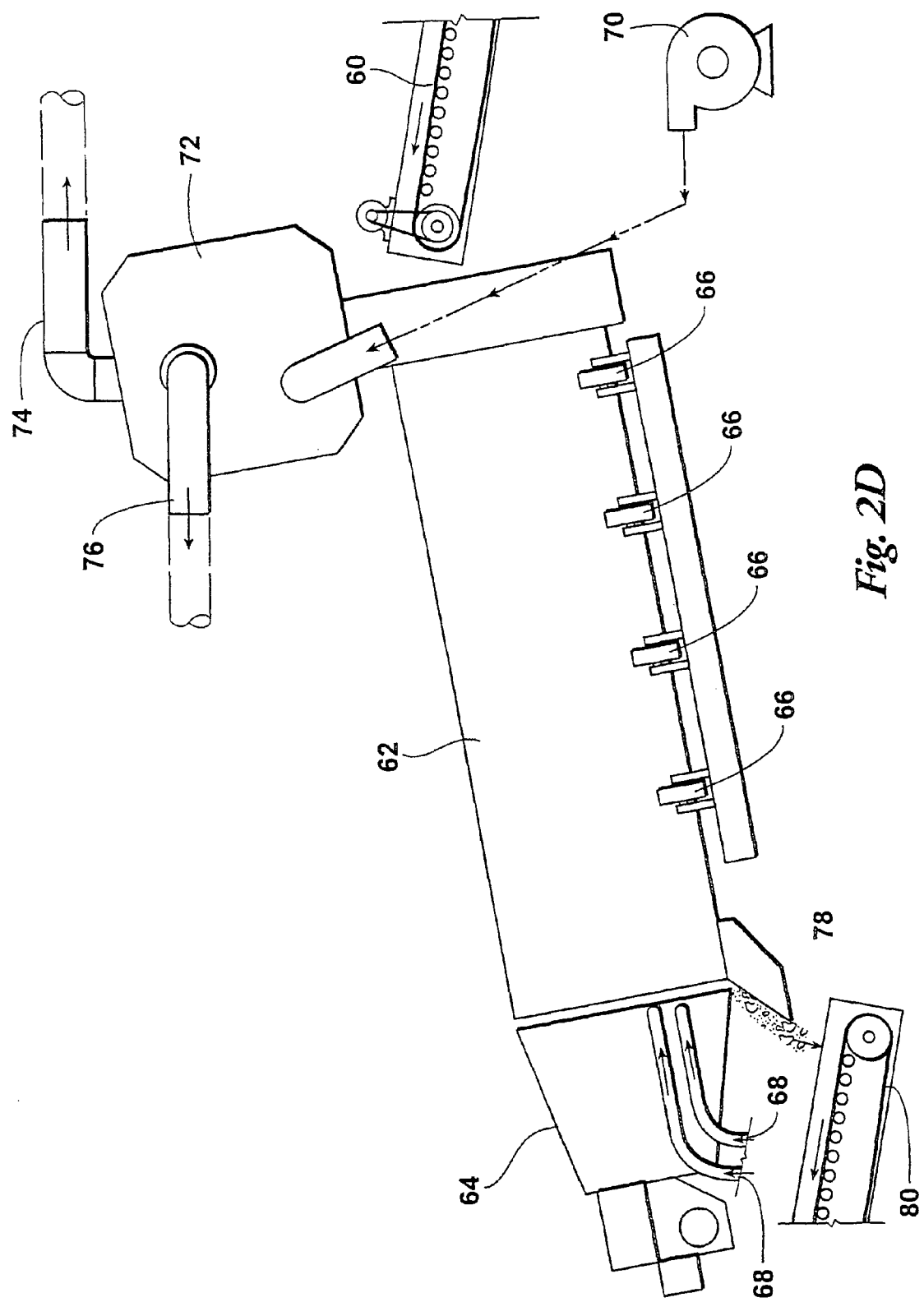
FIG. 2D depicts the particle drying substep 2D of FIG. 1.

From surge hopper 58, the granulated mixture is transferred via a conveyor 60 to a dryer 62. Reference is next made to FIG. 2D. Dryer 62 is in a declined orientation so as to assist the flow of the granulated mixture along its length. Dryer 62 may be a rotating dryer, a fluid bed dryer, or a straight air dryer. The dryer 62 illustrated in the drawings for the purpose of exemplification is a rotating dryer having a firing cone 64 at which the temperature is approximately 1600° F.–1700° F. Dryer 62 is rotated by a plurality of rollers, collectively 66.

The granulated mixture is conveyed through dryer 62 and has a residency time of approximately 8 minutes. The exit temperature of the composite mixture is approximately 250° F. The rolling and heating action of dryer 62 accomplishes the purpose of removing moisture from the manufactured particles comprising the granulated mixture. When the composite particles are dried, the particle decreases in size, thus binding tighter the two component materials to create a low dust, absorbent particle that is lighter in weight than an all clay particle of the same volume.

Fresh air is then put into dryer 62 through several air intake 68. An air pump 70 is ducted to a heat exchanger 72 to provide fresh air and evacuate dead air. The dead air is taken off through a heat exchanger/steam vent 74 which is exhausted into an emissions control device (not shown) such as a cyclone for the recovery of aerosolized materials. Thus, all emissions, including vaporized water and any contaminants released therewith are recovered. Heat exchanger 72 is also ducted to fresh air ducts via conduit 76. A dry granule mixture 78 is thus output from dryer 62 and deposited on a conveyor 80.

Figure 2E:
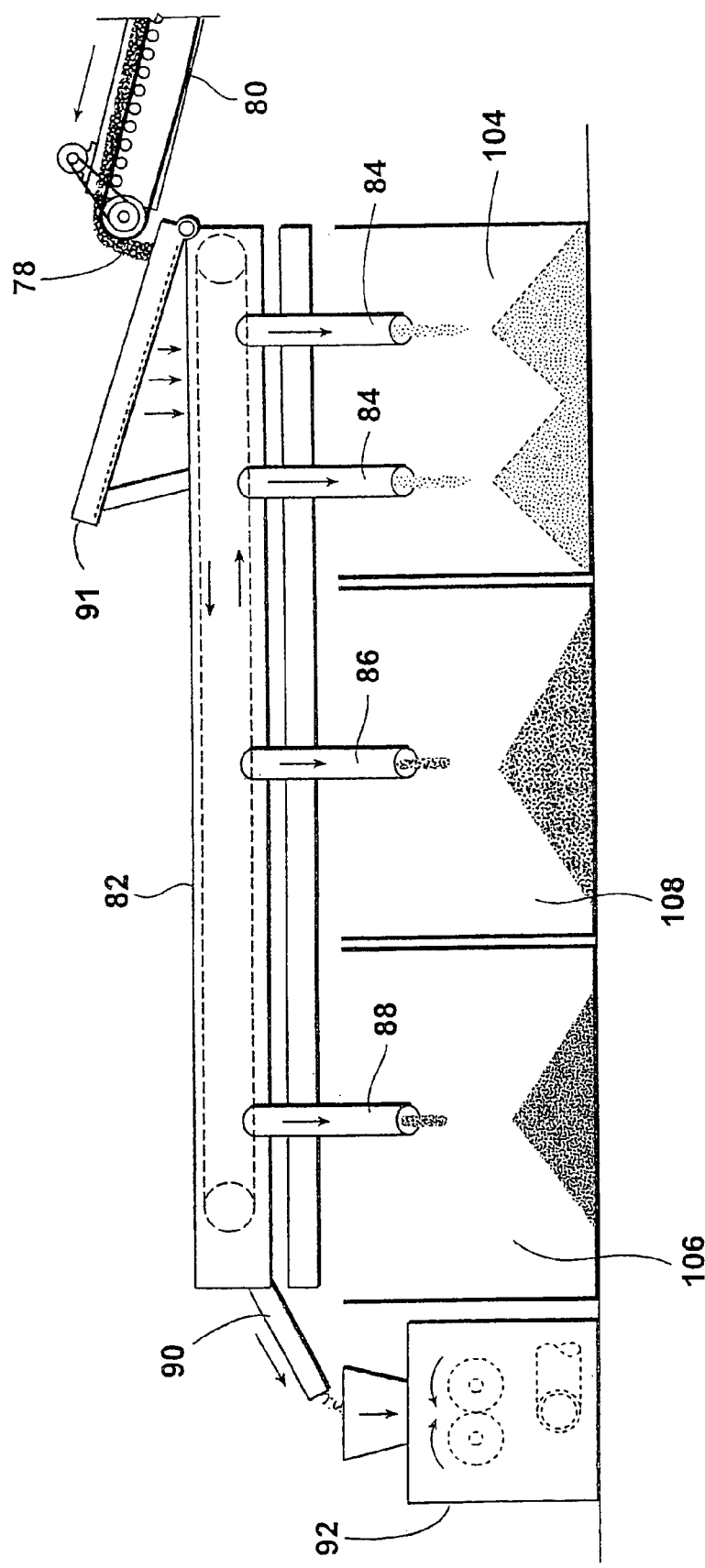
FIG. 2E shows the particle separation substep 2E of FIG. 1.

Reference is next made to FIG. 2E wherein the dry granule mixture 78 is conveyed by conveyor 80 onto a shaking conveyor 82. The shaking conveyor 82 functions as a separator for receiving the dry composite particles of the granulized mixture 78 for separation based upon particle size to form piles of segregated product particles. The dry granule mixture is passed over screens of various mesh sizes to segregate the product which is then dispensed into piles through chutes 84, 86, 88, and 90.

Referring back to FIG. 2E, particles larger than approximately ½" are removed from shaking conveyor 82 and deposited in bin 92 through chute 90. These large particles are transported and recirculated through the process. In the process of the alternative embodiment, the larger particles are again processed through the hammer mill and processed as described above.

The particles exiting through chutes 84 pass through a 20 mesh sieve screen and are collected in a first bin 104. These particles are usually considered too fine and are also efficiently reprocessed and thereby re-manufactured into a useable particle size. Thus, substantially all raw material becomes useful.

The remaining particles are preferably divided into two or more groups. The screen sizes utilized to divide these particles may vary, but are generally between 40 mesh (0.42 mm), up to 6 mesh. As an example, particles passing through a 12 mesh sieve screen, may be exited through chute 88 into a bin 106. Larger particles may be passed through an 8 mesh sieve screen and exited through chute 86 into a bin 108. The particles processed into the bins may then be bagged and shipped for use as a cat litter product. In a preferred embodiment, the particles or granules are substantially in the size range of 30 mesh to 6 mesh.

While the invention has been described with a certain degree of particularity, it is manifest that many changes may be made in the details of construction without departing from the spirit and scope of this disclosure. It is understood that the invention is not limited to the embodiment set forth herein for purposes of exemplification, but is to be limited only by the scope of the attached claim or claims, including the full range of equivalency to which each element thereof is entitled.

What is claimed is:

1. A cat litter product comprising composite agglomerated granules formed of at least (i) particles of an absorbent filler material, and (ii) an effective odor controlling amount of silica gel particles wherein said silica gel particles are entrapped in said composite agglomerated granules.

2. The product of claim 1 wherein said granules are substantially in the size range of from 30 mesh to 6 mesh.

3. The product of claim 1 wherein substantially all of said silica gel particles are minus 20 mesh in size.

4. The product of claim 3 wherein 50% or more of said silica gel particles are minus 200 mesh in size.

5. The product of claim 1 wherein said filler material comprises clay.

6. The product of claim 5 wherein said filler material is bentonite clay.

7. The product of claim 6 wherein said bentonite clay is sodium bentonite.

8. The product of claim 5 wherein substantially all of said particles of said clay and said silica gel particles are minus 20 mesh in size.

9. The product of claim 8 wherein the majority of said particles of said clay and said silica gel particles are minus 200 mesh in size.

10. The product of claim 1 wherein said silica gel is Type C silica gel.

11. The product of claim 10 comprising from 1–70 wt. % silica gel particles.

12. The product of claim 11 comprising from 1–10 wt. % silica gel particles.

13. The product of claim 12 comprising from 3–5 wt. % silica gel particles.

14. A cat litter product comprising composite agglomerated granules formed of at least (i) particles of an absorbent filler material, and (ii) an effective odor controlling amount of silica gel dust wherein said silica gel dust is entrapped in said composite agglomerated granules.

15. The product of claim 1 wherein said filler material comprises clay.

16. The product of claim 15 wherein said filler material is bentonite clay.

17. The product of claim 16 wherein said bentonite clay is sodium bentonite.

18. The product of claim 15 wherein substantially all of said particles of said clay and sand silica gel dust are minus 200 mesh in size.

19. The product of claim 14 wherein said silica gel dust is Type C silica gel.

20. The product of claim 14 comprising from 3–5 wt. % silica gel dust.

* * * * *